US012633837B2

(12) United States Patent
Chang et al.

(10) Patent No.: US 12,633,837 B2
(45) Date of Patent: May 19, 2026

(54) POWER CONVERTER AND MAGNETIC ELEMENT

(71) Applicant: Delta Electronics, Inc., Taoyuan City (TW)

(72) Inventors: Xueliang Chang, Shanghai (CN); Huanhuan Zhang, Shanghai (CN); Mingjie Shan, Shanghai (CN)

(73) Assignee: Delta Electronics, Inc., Taoyuan City (TW)

( * ) Notice: Subject to any disclaimer, the term of this patent is extended or adjusted under 35 U.S.C. 154(b) by 270 days.

(21) Appl. No.: 18/594,056

(22) Filed: Mar. 4, 2024

(65) Prior Publication Data

US 2024/0396461 A1      Nov. 28, 2024

(30) Foreign Application Priority Data

May 26, 2023    (CN) .......................... 202310609722.6

(51) Int. Cl.
H01F 27/26        (2006.01)
H01F 27/28        (2006.01)
H02M 3/335        (2006.01)

(52) U.S. Cl.
CPC ........ H02M 3/33576 (2013.01); H01F 27/26 (2013.01); H01F 27/28 (2013.01)

(58) Field of Classification Search
CPC ..... H02M 3/33576; H01F 27/26; H01F 27/28
See application file for complete search history.

(56) References Cited

U.S. PATENT DOCUMENTS

| | | | | |
|---|---|---|---|---|
| 10,269,484 | B2 * | 4/2019 | Jin | H01F 27/2804 |
| 12,027,986 | B2 * | 7/2024 | Elshaer | H02M 3/33592 |
| 2019/0043661 | A1 * | 2/2019 | Jin | H01F 27/346 |
| 2025/0087410 | A1 * | 3/2025 | Jin | H01F 27/24 |

FOREIGN PATENT DOCUMENTS

| | | |
|---|---|---|
| CN | 108418432 B | 12/2019 |
| CN | 114389455 A | 12/2019 |

* cited by examiner

*Primary Examiner* — Adolf D Berhane
(74) *Attorney, Agent, or Firm* — KIRTON McCONKIE; Evan R. Witt

(57)        ABSTRACT

A power converter includes a plurality of conversion circuits connected with each other in parallel. Each of the conversion circuits includes a transformer. The transformer of each of the plurality of conversion circuits includes a magnetic core assembly, at least one primary winding, at least one secondary winding and at least one auxiliary winding. Each magnetic core assembly includes a plurality of magnetic legs. The at least one primary winding, the at least one secondary winding and the at least one auxiliary winding are wound on the plurality of magnetic legs. The at least one auxiliary winding of one conversion circuit is serially connected with the at least one auxiliary winding of other conversion circuit to form at least one loop. The present disclosure also provides a magnetic element.

21 Claims, 7 Drawing Sheets

POWER CONVERTER AND MAGNETIC ELEMENT

CROSS-REFERENCE TO RELATED APPLICATION

This application claims priority to China Patent Application No. 202310609722.6, filed on May 26, 2023, the entire content of which is incorporated herein by reference for all purposes.

FIELD OF THE INVENTION

The present disclosure relates to a technology of dynamically adjusting a load current, and more particularly to power converter and a magnetic element of the power converter.

BACKGROUND OF THE INVENTION

Nowadays, the big data technology and the artificial intelligence technology have penetrated into various industries, and thus their demands on the high-performance computing capabilities are growing. A data center is an infrastructure that supports computing services and is used to deliver, accelerate, analyze, calculate and store data information. With the rapid development of the artificial intelligence technology, the data transmission amount undertaken by the data center has increased significantly. Due to the continuously increased loading, it is necessary to increase the size and density of the data center. As the power demand increases, the supply voltage is increased from 12V to 48V in order to meet the power requirements of the terminal products.

Conventionally, the power supply system for the data center uses a 12V power bus. In addition, the power converter of the power supply system is composed of discrete components. Consequently, both of the power density and the efficiency are not high, and the load dynamic effect is unable to reach a satisfied level. At the same time, the simple one-stage power converter also cannot meet the load current dynamic effect.

SUMMARY OF THE INVENTION

The present disclosure provides a power converter with the enhanced load current dynamic effect.

The present disclosure also provides a magnetic element for the power converter.

In accordance with an aspect of the present disclosure, a power converter is provided. The power converter includes a plurality of conversion circuits connected with each other in parallel. Each of the conversion circuits includes a transformer. The transformer of each of the plurality of conversion circuits includes a magnetic core assembly, at least one primary winding, at least one secondary winding and at least one auxiliary winding. Each magnetic core assembly includes a plurality of magnetic legs. The at least one primary winding, the at least one secondary winding and the at least one auxiliary winding are wound on the plurality of magnetic legs. The at least one auxiliary windings of one conversion circuit is serially connected with the at least one auxiliary winding of other conversion circuit to form at least one loop.

In accordance with another aspect of the present disclosure, a magnetic element is provided. The magnetic element includes a plurality of transformers connected with each other in parallel. At least one of the plurality of transformers includes a magnetic core assembly, at least one primary winding, at least one secondary winding and at least one auxiliary winding. Each magnetic core assembly includes a plurality of magnetic legs. The at least one primary winding, the at least one secondary winding and the at least one auxiliary winding are wound on the plurality of magnetic legs. The at least one auxiliary windings of one transformer is serially connected with the at least one auxiliary winding of other transformer to form at least one loop.

The above contents of the present disclosure will become more readily apparent to those ordinarily skilled in the art after reviewing the following detailed description and accompanying drawings, in which:

DETAILED DESCRIPTION OF THE EMBODIMENTS

The present disclosure will now be described more specifically with reference to the following embodiments. It is to be noted that the following descriptions of the embodiments of this disclosure are presented herein for purpose of illustration and description only. It is not intended to be exhaustive or to be limited to the precise form disclosed.

The present disclosure provides a power converter. The power converter includes a plurality of conversion circuits connected with each other in parallel. Each of the plurality of conversion circuits include a transformer. The transformer of each of the plurality of conversion circuits includes a magnetic core assembly, at least one primary winding, at least one secondary winding and at least one auxiliary winding. Each magnetic core assembly includes a plurality of magnetic legs. The at least one primary winding, the at least one secondary winding and the at least one auxiliary winding are wound on the plurality of magnetic legs. The at least one auxiliary windings of one conversion circuit is serially connected with the at least one auxiliary winding of other conversion circuit to form at least one loop.

Figure 1:
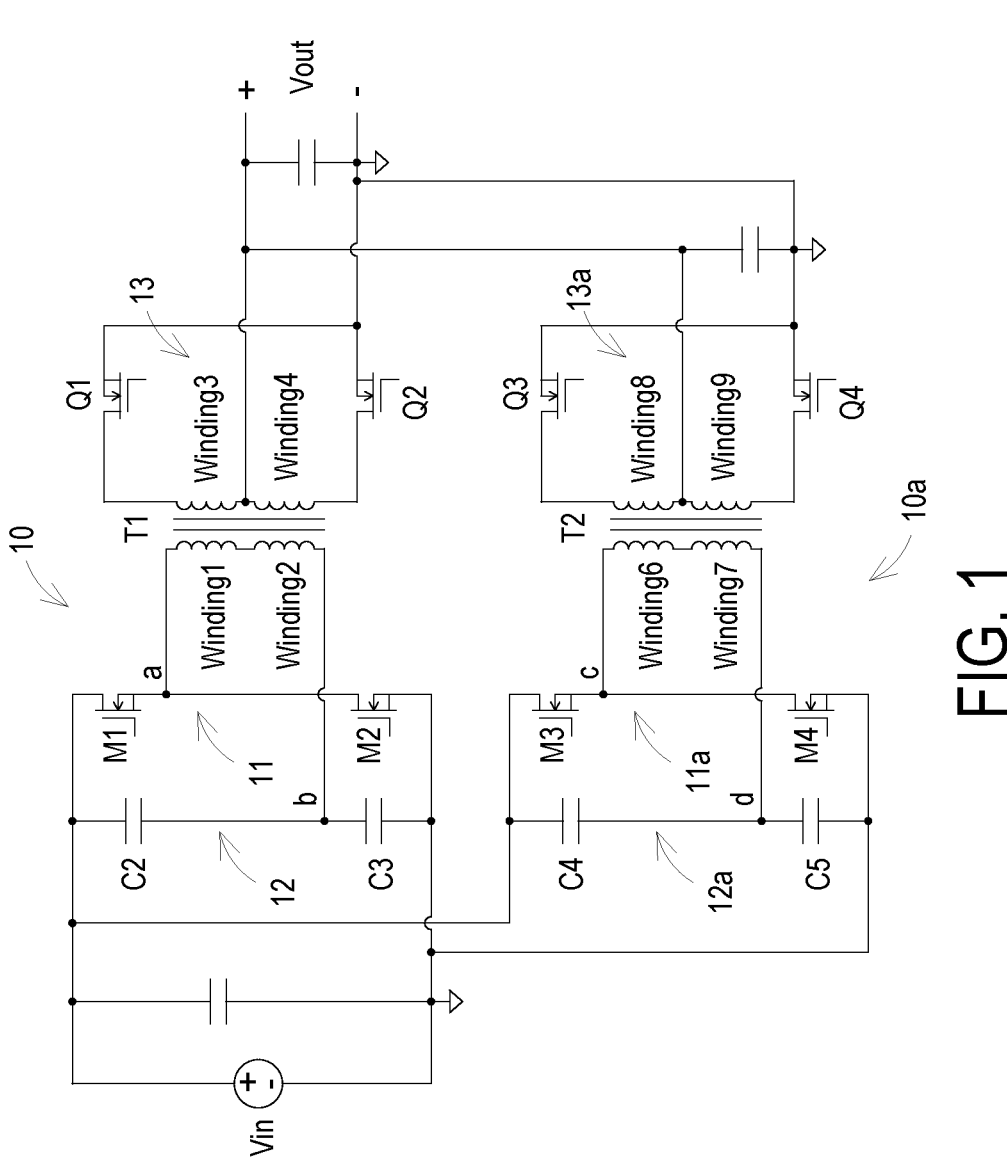
FIG. 1 is a schematic circuit diagram illustrating the circuitry topology of a power converter according to a first embodiment of the present disclosure.
Figure 2:
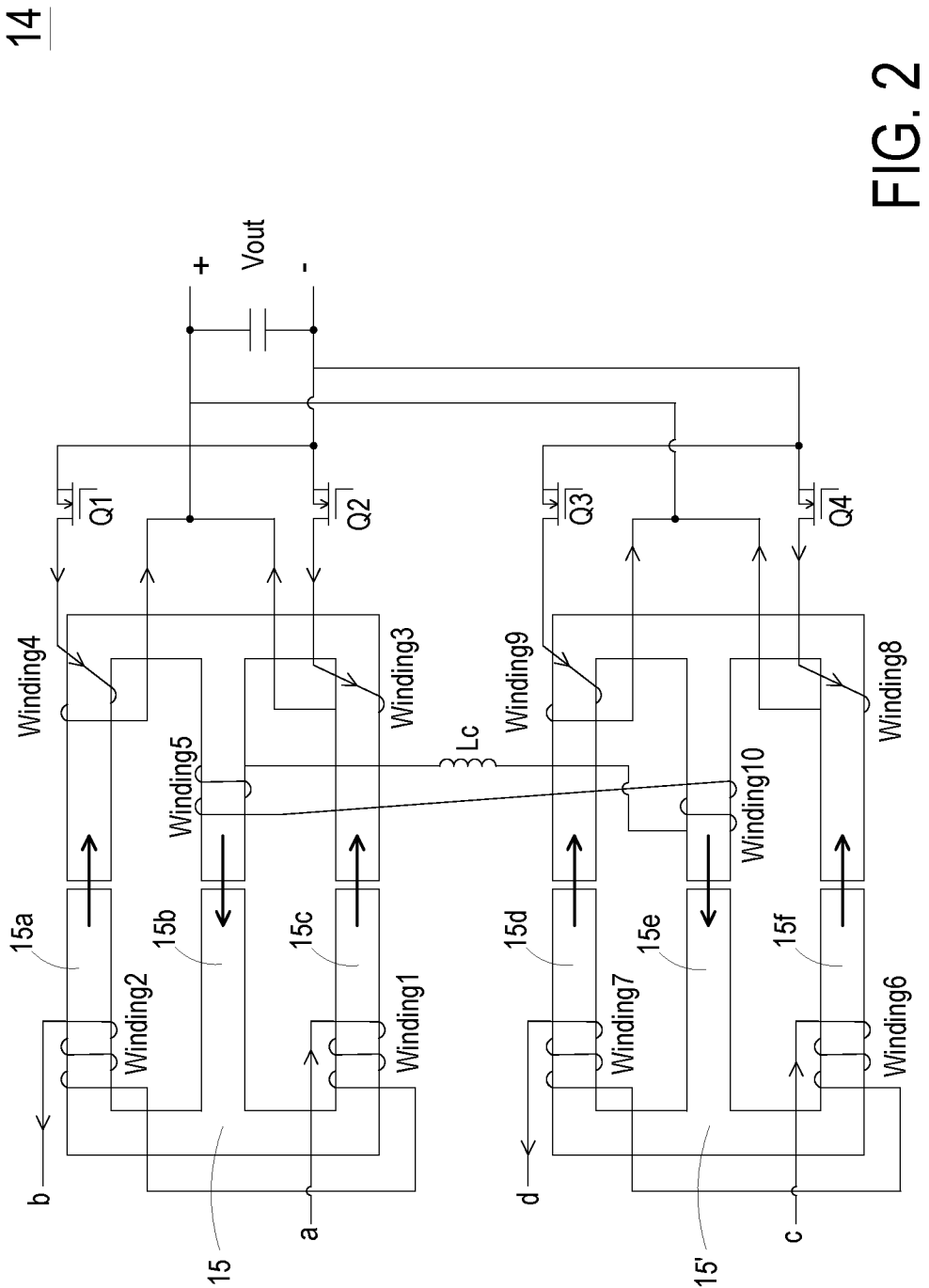
FIG. 2 schematically illustrates a magnetic element and associated windings for the power converter according to the first embodiment of the present disclosure.

FIG. 1 is a schematic circuit diagram illustrating the circuitry topology of a power converter according to a first embodiment of the present disclosure. FIG. 2 schematically illustrates a magnetic element and associated windings for the power converter according to the first embodiment of the present disclosure. The power converter includes at least two conversion circuits. For brevity, the power converter 1 as shown in FIGS. 1 and 2 includes a conversion circuit 10 and a conversion circuit 10a. It should be noted that the auxiliary windings Winding5 and Winding10 are not shown in FIG. 1.

The input terminal of the conversion circuit 10 and the input terminal of the conversion circuit 10a are connected with the input terminal of the power converter 1 in parallel and electrically connected with an input power source Vin. The output terminal of the conversion circuit 10 and the output terminal of the conversion circuit 10a are connected with the output terminal of the power converter 1 in parallel and electrically connected with a load (not shown). Each of the conversion circuit 10 and the conversion circuit 10a receives an input voltage from the input power source Vin. By each of the conversion circuit 10 and the conversion circuit 10a, the input voltage from the input power source Vin is converted into an output voltage Vout.

The conversion circuit 10 includes a half-bridge switching circuit 11, a capacitor bridge arm 12, a transformer T1 and a rectifier circuit 13. The half-bridge switching circuit 11 and the capacitor bridge arm 12 are collaboratively formed as a half-bridge inverter circuit of the conversion circuit 10. The half-bridge switching circuit 11 includes two switch elements M1 and M2 connected in series. The two switch elements M1 and M2 are connected with a first node a. The capacitor bridge arm 12 includes two capacitors C2 and C3 connected in series. The two capacitors C2 and C3 are connected with a second node b.

It is noted that numerous modifications and alterations may be made while retaining the teachings of the disclosure. For example, in a variant example of the first embodiment, the half-bridge inverter circuit is replaced by a full-bridge inverter circuit (not shown). Similarly, in the variant examples of the following embodiments, the half-bridge inverter circuit may be replaced by a full-bridge inverter circuit.

The transformer T1 includes a first primary winding Winding1, a second primary winding Winding2, a first secondary winding Winding3 and a second secondary winding Winding4. The first primary winding Winding1, the second primary winding Winding2, the first secondary winding Winding3 and the second secondary winding Winding4 are magnetically coupled with each other. The first primary winding Winding1 and the second primary winding Winding2 are serially connected between the first node a and the second node b. The first secondary winding Winding3 and the second secondary winding Winding4 are connected with each other. The node between the first secondary winding Winding3 and the second secondary winding Winding4 is connected with an output positive terminal of the output terminal of the conversion circuit 10.

The input terminal of the rectifier circuit 13 is electrically connected with the first secondary winding Winding3 and the second secondary winding Winding4. The output terminal of rectifier circuit 13 is electrically connected with an output negative terminal of the output terminal of conversion circuit 10. The rectifier circuit 13 includes two rectifier switches Q1 and Q2.

The circuitry topology of the conversion circuit 10a is similar to the circuitry topology of the conversion circuit 10. That is, the conversion circuit 10a includes a half-bridge switching circuit 11a, a capacitor bridge arm 12a, a transformer T2 and a rectifier circuit 13a. The half-bridge switching circuit 11a and the capacitor bridge arm 12a are collaboratively formed as a half-bridge inverter circuit of the conversion circuit 10a. The half-bridge switching circuit 11a includes two switch elements M3 and M4. The two switch elements M3 and M4 are connected with a first node c. The capacitor bridge arm 12a includes two capacitors C4 and C5. The two capacitors C4 and C5 are connected with a second node d.

The transformer T2 includes a first primary winding Winding6, a second primary winding Winding7, a first secondary winding Winding8 and a second secondary winding Winding9. The first primary winding Winding6, the second primary winding Winding7, the first secondary winding Winding8 and the second secondary winding Winding9 are magnetically coupled with each other. The first primary winding Winding6 and the second primary winding Winding7 are serially connected between the first node c and the second node d. The first secondary winding Winding8 and the second secondary winding Winding9 are connected with each other. The node between the first secondary winding Winding8 and the second secondary winding Winding9 is connected with an output positive terminal of the output terminal of the conversion circuit 10a.

The input terminal of the rectifier circuit 13a is electrically connected with the first secondary winding Winding8 and the second secondary winding Winding9. The output terminal of rectifier circuit 13a is electrically connected with an output negative terminal of the output terminal of conversion circuit 10a. The rectifier circuit 13a includes two rectifier switches Q3 and Q4.

The power converter 1 further includes a magnetic element 14. The magnetic element 14 includes at least two magnetic core assemblies. The number of the magnetic core assemblies is identical to the number of the conversion circuits. As shown in FIG. 2, the magnetic element 14 includes two magnetic core assemblies 15 and 15'. The magnetic core assembly 15 and the associated windings are collaboratively formed as the transformer T1. The magnetic core assembly 15' and the associated windings are collaboratively formed as the transformer T2.

The magnetic core assembly 15 includes three magnetic legs. The transformer T1 includes the magnetic core assembly 15, the first primary winding Winding1, the second primary winding Winding2, the first secondary winding Winding3, the second secondary winding Winding4 and an auxiliary winding Winding5. The three magnetic legs include a first lateral leg 15a, a middle leg 15b and a second lateral leg 15c. The middle leg 15b is arranged between the first lateral leg 15a and the second lateral leg 15c. The first primary winding Winding1 is wound on the second lateral leg 15c. The second primary winding Winding2 is wound on the first lateral leg 15a. The first secondary winding Winding3 is wound on the second lateral leg 15c. The second secondary winding Winding4 is wound on the first lateral leg 15a. The auxiliary winding Winding5 is wound on the middle leg 15b.

The structure of the magnetic core assembly 15' is similar to the structure of the magnetic core assembly 15. That is, the magnetic core assembly 15' includes three magnetic legs. The transformer T2 includes the magnetic core assembly 15', the first primary winding Winding6, the second primary winding Winding7, the first secondary winding Winding8, the second secondary winding Winding9 and an auxiliary winding Winding10. The three magnetic legs include a first lateral leg 15d, a middle leg 15e and a second lateral leg 15f. The middle leg 15e is arranged between the first lateral leg 15d and the second lateral leg 15f. The first primary winding Winding6 is wound on the second lateral leg 15f. The second primary winding Winding7 is wound on the first lateral leg 15d. The first secondary winding Winding8 is wound on the second lateral leg 15f. The second secondary winding Winding9 is wound on the first lateral leg 15d. The auxiliary winding Winding10 is wound on the middle leg 15e.

The auxiliary winding Winding5, the auxiliary winding Winding10 and an inductor Lc are serially connected with each other and formed as a closed loop. For example, the inductor Lc is an individual inductor device. Alternatively, the inductor Lc is a parasitic inductor of at least one auxiliary winding. The closed loop passes through the first magnetic core assembly 15 and the second magnetic core assembly 15'. Since the auxiliary winding Winding5 and the auxiliary winding Winding10 are connected with each other, the two transformers T1 and T2 are magnetically coupled with each other.

In this embodiment, the first primary winding Winding1, the second primary winding Winding2, the first secondary winding Winding3 and the second secondary winding Winding4 are collaboratively formed as an anti-coupling current doubler circuit. Similarly, the first primary winding Winding6, the second primary winding Winding7, the first secondary winding Winding8 and the second secondary winding Winding9 are collaboratively formed as another anti-coupling current doubler circuit.

In an embodiment, there is a phase difference between the PWM signal for controlling the conversion circuit 10 and the PWM signal for controlling the conversion circuit 10a. In case that the power converter 1 is not equipped with the auxiliary windings Winding5 and Winding10, some problems occur. If the load is subjected to a sudden change, the dynamic response time of the phase-lag conversion circuit to the load current must be later than that of the phase-lead conversion circuit to the load current. The load current is equal to the sum of the output currents from the two conversion circuits 10 and 10a. Consequently, the dynamic response speed of the load current is usually insufficient. On the other hand, in case that the power converter 1 is equipped with the auxiliary windings Winding5 and Winding10, the coupling relationship between the transformer T1 of the conversion circuit 10 and the transformer T2 of the conversion circuit 10a is established. If the load is subjected to a sudden change, the phase-lead conversion circuit firstly responds to the duty cycle. The duty cycle response is coupled to the other parallel-connected conversion circuits through the auxiliary windings Winding5 and Winding10.

For example, in FIGS. 1 and 2, the conversion circuit 10 is the phase-lead conversion circuit, and the conversion circuit 10a is the phase-lag conversion circuit. If the load is suddenly increased, the duty cycles of the signals for controlling the two switch elements M1 and M2 in the half-bridge switching circuit 11 of the conversion circuit 10 are increased. Due to the increased duty cycles, the middle leg 15 with the wound auxiliary winding Winding5 will generate the corresponding magnetic flux. Consequently, a current is correspondingly generated by the auxiliary winding Winding5. Since the auxiliary windings Winding5 and Winding10 are connected with each other, the current generated by the auxiliary winding Winding5 will excite a magnetic flux on the middle leg 15e with the wound auxiliary winding Winding10. Consequently, the first secondary winding Winding8 or the second secondary winding Winding9 generates a current.

As mentioned above, there is a phase difference between the PWM signal for controlling the conversion circuit 10 and the PWM signal for controlling the conversion circuit 10a. In the embodiment of FIG. 1, the conversion circuit 10 receives a first driving signal, and the conversion circuit 10a receives a second driving signal. The phase difference between the first driving signal and the second driving signal is 180 degrees. Due to the current generated by the first secondary winding Winding8 or the second secondary winding Winding9, the magnetic flux in the magnetic core assembly 15' is early responded. The output current from the phase-lag conversion circuit 10a is adjusted in advance. The load current is equal to the sum of the output currents from the two conversion circuits 10 and 10a. Due to the coupling relationship between the auxiliary windings Winding5 and Winding10, the load current dynamic effect is enhanced.

Figure 3:
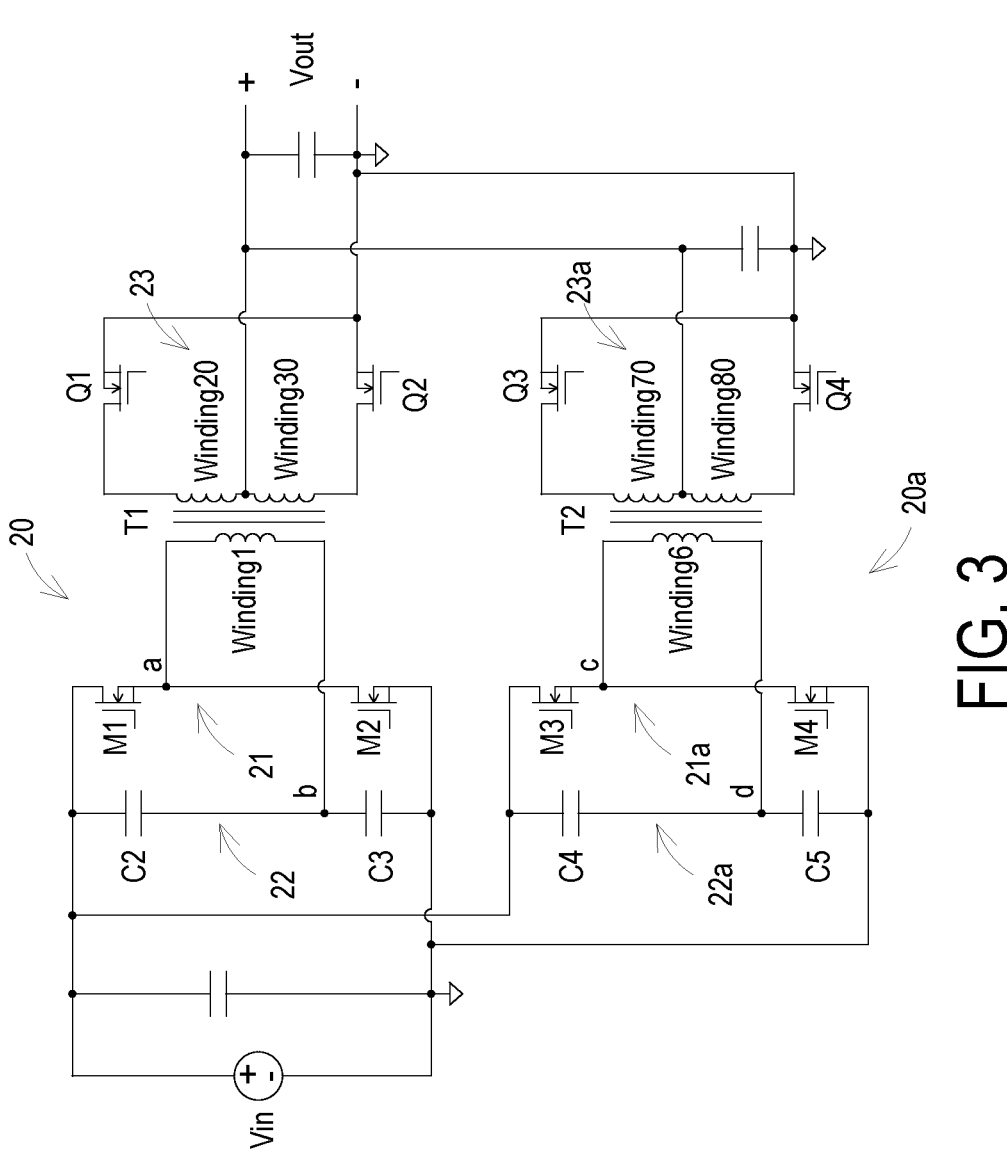
FIG. 3 is a schematic circuit diagram illustrating the circuitry topology of a power converter according to a second embodiment of the present disclosure.
Figure 4A:
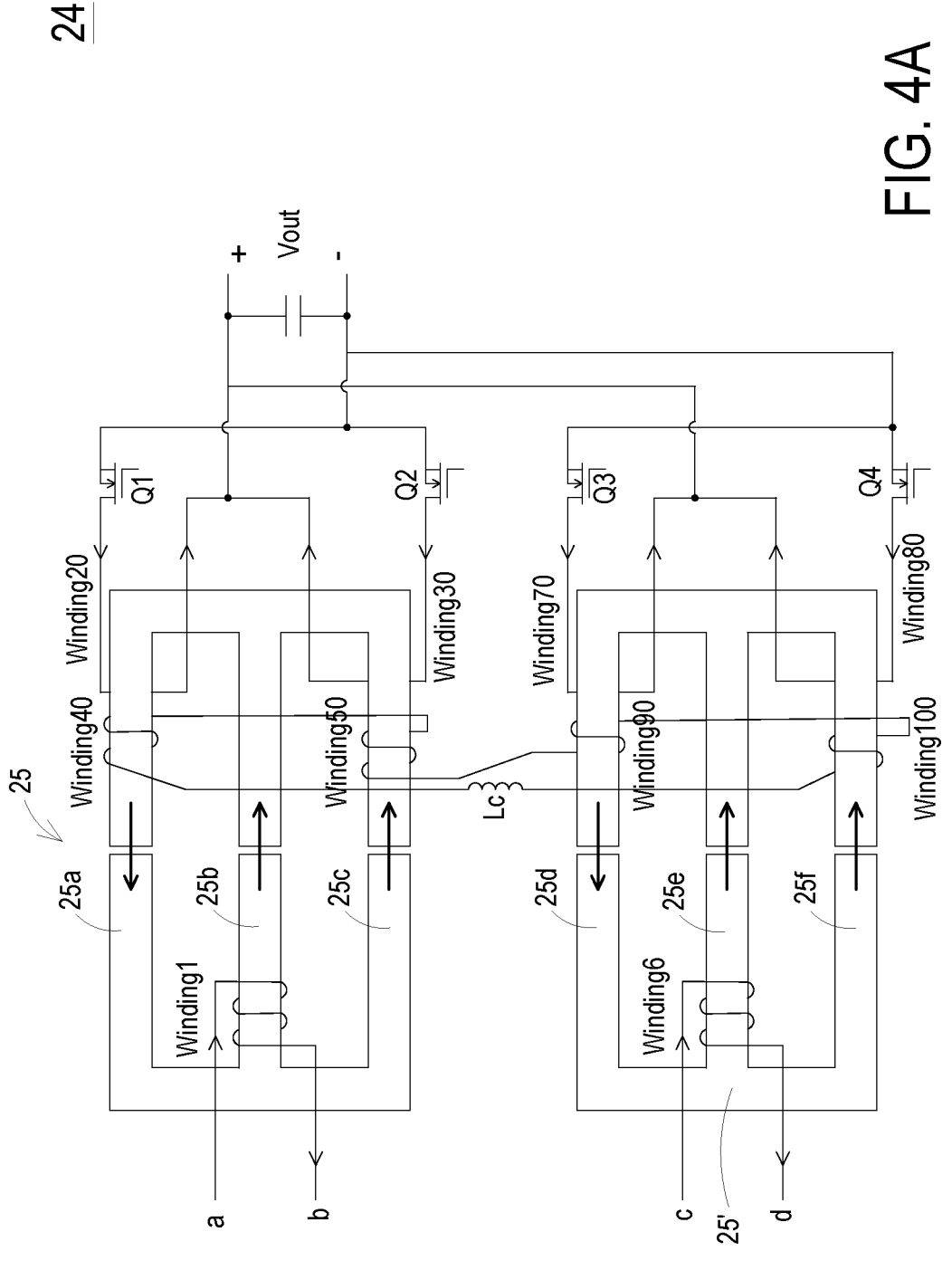
FIG. 4A schematically illustrates a magnetic element and associated windings for the power converter according to the second embodiment of the present disclosure.

FIG. 3 is a schematic circuit diagram illustrating the circuitry topology of a power converter according to a second embodiment of the present disclosure. FIG. 4A schematically illustrates a magnetic element and associated windings for the power converter according to the second embodiment of the present disclosure. The power converter 2 includes a conversion circuit 20 and a conversion circuit 20a. It should be noted that the auxiliary windings Winding40, Winding50, Winding90 and Winding100 are not shown in FIG. 3.

The input terminal of the conversion circuit 20 and the input terminal of the conversion circuit 20a are connected with the input terminal of the power converter 2 in parallel and electrically connected with an input power source Vin. The output terminal of the conversion circuit 20 and the output terminal of the conversion circuit 20a are connected with the output terminal of the power converter 2 in parallel and electrically connected with a load (not shown). Each of the conversion circuit 20 and the conversion circuit 20a receives an input voltage from the input power source Vin. By each of the conversion circuit 20 and the conversion circuit 20a, the input voltage from the input power source Vin is converted into an output voltage Vout.

The conversion circuit 20 includes a half-bridge switching circuit 21, a capacitor bridge arm 22, a transformer T1 and a rectifier circuit 23. The half-bridge switching circuit 21 and the capacitor bridge arm 22 are collaboratively formed as a half-bridge inverter circuit of the conversion circuit 20. The half-bridge switching circuit 21 includes two switch elements M1 and M2. The two switch elements M1 and M2 are connected with a first node a. The capacitor bridge arm 22 includes two capacitors C2 and C3. The two capacitors C2 and C3 are connected with a second node b.

The transformer T1 includes a first primary winding Winding1, a first secondary winding Winding20 and a second secondary winding Winding30. The first primary winding Winding1, the first secondary winding Winding20 and the second secondary winding Winding30 are magnetically coupled with each other. The first primary winding Winding1 is connected between the first node a and the second node b. The first secondary winding Winding20 and the second secondary winding Winding30 are connected with each other. The node between the first secondary winding Winding20 and the second secondary winding Winding30 is connected with an output positive terminal of the output terminal of the conversion circuit 20.

The input terminal of the rectifier circuit 23 is electrically connected with the first secondary winding Winding20 and the second secondary winding Winding30. The output terminal of the rectifier circuit 23 is electrically connected with an output negative terminal of the output terminal of conversion circuit 20. The rectifier circuit 23 includes two rectifier switches Q1 and Q2.

The circuitry topology of the conversion circuit 20a is similar to the circuitry topology of the conversion circuit 20. That is, the conversion circuit 20a includes a half-bridge switching circuit 21a, a capacitor bridge arm 22a, a transformer T2 and a rectifier circuit 23a. The half-bridge switching circuit 21a and the capacitor bridge arm 22a are collaboratively formed as a half-bridge inverter circuit of the conversion circuit 20a. The half-bridge switching circuit 21a includes two switch elements M3 and M4. The two switch elements M3 and M4 are connected with a first node c. The capacitor bridge arm 22a includes two capacitors C4 and C5. The two capacitors C4 and C5 are connected with a second node d.

The transformer T2 includes a first primary winding Winding6, a first secondary winding Winding70 and a second secondary winding Winding80. The first primary winding Winding6, the first secondary winding Winding70 and the second secondary winding Winding80 are magnetically coupled with each other. The first primary winding Winding6 is connected between the first node c and the second node d. The first secondary winding Winding70 and the second secondary winding Winding80 are connected with each other. The node between the first secondary winding Winding70 and the second secondary winding Winding80 is connected with an output positive terminal of the output terminal of the conversion circuit 20a.

The input terminal of the rectifier circuit 23a is electrically connected with the first secondary winding Winding70 and the second secondary winding Winding80. The output terminal of rectifier circuit 23a is electrically connected with an output negative terminal of the output terminal of conversion circuit 20a. The rectifier circuit 23a includes two rectifier switches Q3 and Q4.

The power converter 2 further includes a magnetic element 24. The magnetic element 24 includes at least two magnetic core assemblies. As shown in FIG. 3, the magnetic element 24 includes two magnetic core assemblies 25 and 25'. The magnetic core assembly 25 and the associated windings are collaboratively formed as the transformer T1. The magnetic core assembly 25' and the associated windings are collaboratively formed as the transformer T2.

The magnetic core assembly 25 includes three magnetic legs. The transformer T1 includes the magnetic core assembly 25, the first primary winding Winding1, the first secondary winding Winding20, the second secondary winding Winding30, a first auxiliary winding Winding40 and a second auxiliary winding Winding50. The three magnetic legs include a first lateral leg 25a, a middle leg 25b and a second lateral leg 25c. The middle leg 25b is arranged between the first lateral leg 25a and the second lateral leg 25c.

The first primary winding Winding1 is wound on the middle leg 25b. The first secondary winding Winding20 is wound on the first lateral leg 25a. The second secondary winding Winding30 is wound on the second lateral leg 25c. The first auxiliary winding Winding40 is wound on the first lateral leg 25a. The second auxiliary winding Winding50 is wound on the second lateral leg 25c.

The structure of the magnetic core assembly 25' is similar to the structure of the magnetic core assembly 25. That is, the magnetic core assembly 25' includes three magnetic legs. The transformer T2 includes the magnetic core assembly 25', the first primary winding Winding6, the first secondary winding Winding70, the second secondary winding Winding80, a first auxiliary winding Winding90 and a second auxiliary winding Winding100. The three magnetic legs include a first lateral leg 25d, a middle leg 25e and a second lateral leg 25f. The middle leg 25e is arranged between the first lateral leg 25d and the second lateral leg 25f.

The first primary winding Winding6 is wound on the middle leg 25e. The first secondary winding Winding70 is wound on the first lateral leg 25d. The second secondary winding Winding80 is wound on the second lateral leg 25f. The first auxiliary winding Winding90 is wound on the first lateral leg 25d. The second auxiliary winding Winding100 is wound on the second leg 25f.

The first auxiliary winding Winding90, the second auxiliary winding Winding100, the first auxiliary winding Winding40, the second auxiliary winding Winding50 and an inductor Lc are serially connected with each other and formed as a closed loop. For example, the inductor Lc is an individual inductor device. Alternatively, the inductor Lc is a parasitic inductor of at least one auxiliary winding. The closed loop passes through the first magnetic core assembly 25 and the second magnetic core assembly 25'. Since the first auxiliary winding Winding90, the second auxiliary winding Winding100, the first auxiliary winding Winding40 and the second auxiliary winding Winding50 are connected with each other, the two transformers T1 and T2 are magnetically coupled with each other. In this embodiment, the first primary winding Winding1, the first secondary winding Winding20 and the second secondary winding Winding30 are collaboratively formed as a positive-coupling current doubler circuit. Similarly, the first primary winding Winding6, the first secondary winding Winding70 and the second secondary winding Winding80 are collaboratively formed as another positive-coupling current doubler circuit.

For example, in FIG. 3, the conversion circuit 20 is the phase-lead conversion circuit, and the conversion circuit 20a is the phase-lag conversion circuit. If the load is suddenly increased, the duty cycles of the signals for controlling the two switch elements M1 and M2 in the half-bridge switching circuit 21 of the conversion circuit 20 are increased. Due to the increased duty cycles, the first lateral leg 25a with the wound first auxiliary winding Winding40 and the second lateral leg 25c with the wound second auxiliary winding Winding50 will generate the corresponding magnetic fluxes. Consequently, a current is correspondingly generated by the first auxiliary winding Winding40 and the second auxiliary winding Winding50. Since the first auxiliary winding Winding90, the second auxiliary winding Winding100, the first auxiliary winding Winding40 and the second auxiliary winding Winding50 are connected with each other, the current generated by the first auxiliary winding Winding40 and the second auxiliary winding Winding50 will excite a magnetic flux on the first lateral leg 25d and the second lateral leg 25f with the wound auxiliary windings Winding90 and Winding100. Consequently, the first secondary winding Winding70 or the second secondary winding Winding80 generates a current.

As mentioned above, there is a phase difference between the PWM signal for controlling the conversion circuit 20 and the PWM signal for controlling the conversion circuit 20a. In the embodiment of FIG. 3, the conversion circuit 20 receives a first driving signal, and the conversion circuit 20a receives a second driving signal. The phase difference between the first driving signal and the second driving signal is 180 degrees. Consequently, the magnetic flux in the magnetic core assembly 25' is early responded. The output current from the phase-lag conversion circuit 20a is adjusted in advance. The load current is equal to the sum of the output currents from the two conversion circuits 20 and 20a. Due to the coupling relationship between the auxiliary windings Winding40, Winding50, Winding90 and Winding100, the load current dynamic effect is enhanced.

Figure 4B:
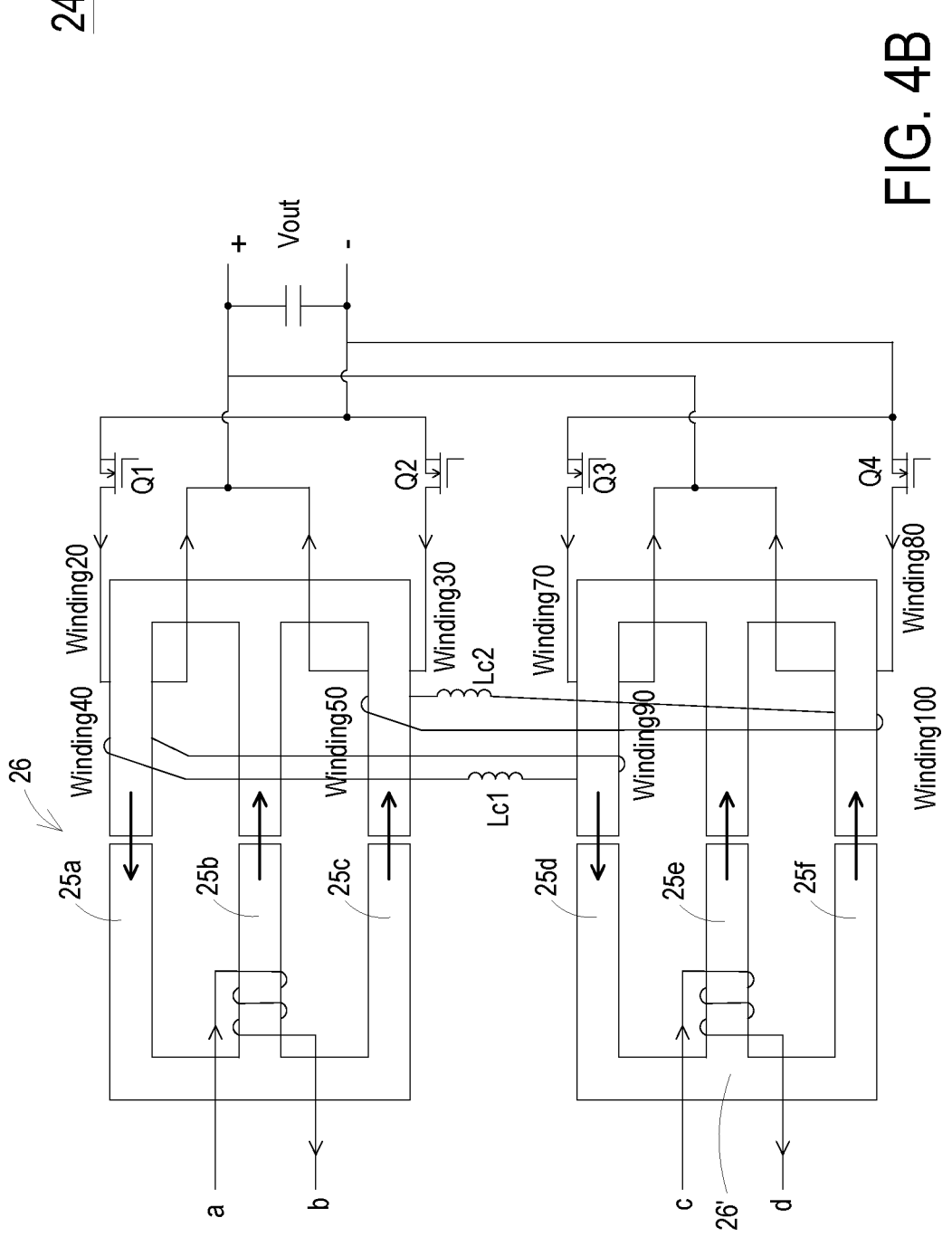
FIG. 4B schematically illustrates a variant example of the magnetic element for the power converter according to the second embodiment of the present disclosure.

FIG. 4B schematically illustrates a variant example of the magnetic element for the power converter according to the second embodiment of the present disclosure. In comparison with the magnetic element core assemblies 25 and 25' of FIG. 4A, the method of winding the auxiliary windings on the magnetic element core assemblies 26 and 26' of the magnetic element 24 is distinguished. As shown in FIG. 4B, the first auxiliary winding Winding40 of the magnetic core assembly 26, the first auxiliary winding Winding90 of the magnetic core assembly 26' and a first inductor Lc1 are serially connected with each other and formed as a first closed loop. In addition, the second auxiliary winding Winding50 of the magnetic core assembly 26, the second auxiliary winding Winding100 of the magnetic core assembly 26' and a second inductor Lc2 are serially connected with each other and formed as a second closed loop. For example, each of the inductors Lc1 and Lc2 is an individual inductor device. Alternatively, each of the inductors Lc1 and Lc2 is a parasitic inductor of at least one auxiliary winding. The operations of the magnetic element 24 of FIG. 4B are similar to the operations of the magnetic element 24 of FIG. 4A, and not redundantly described herein.

Figure 5:
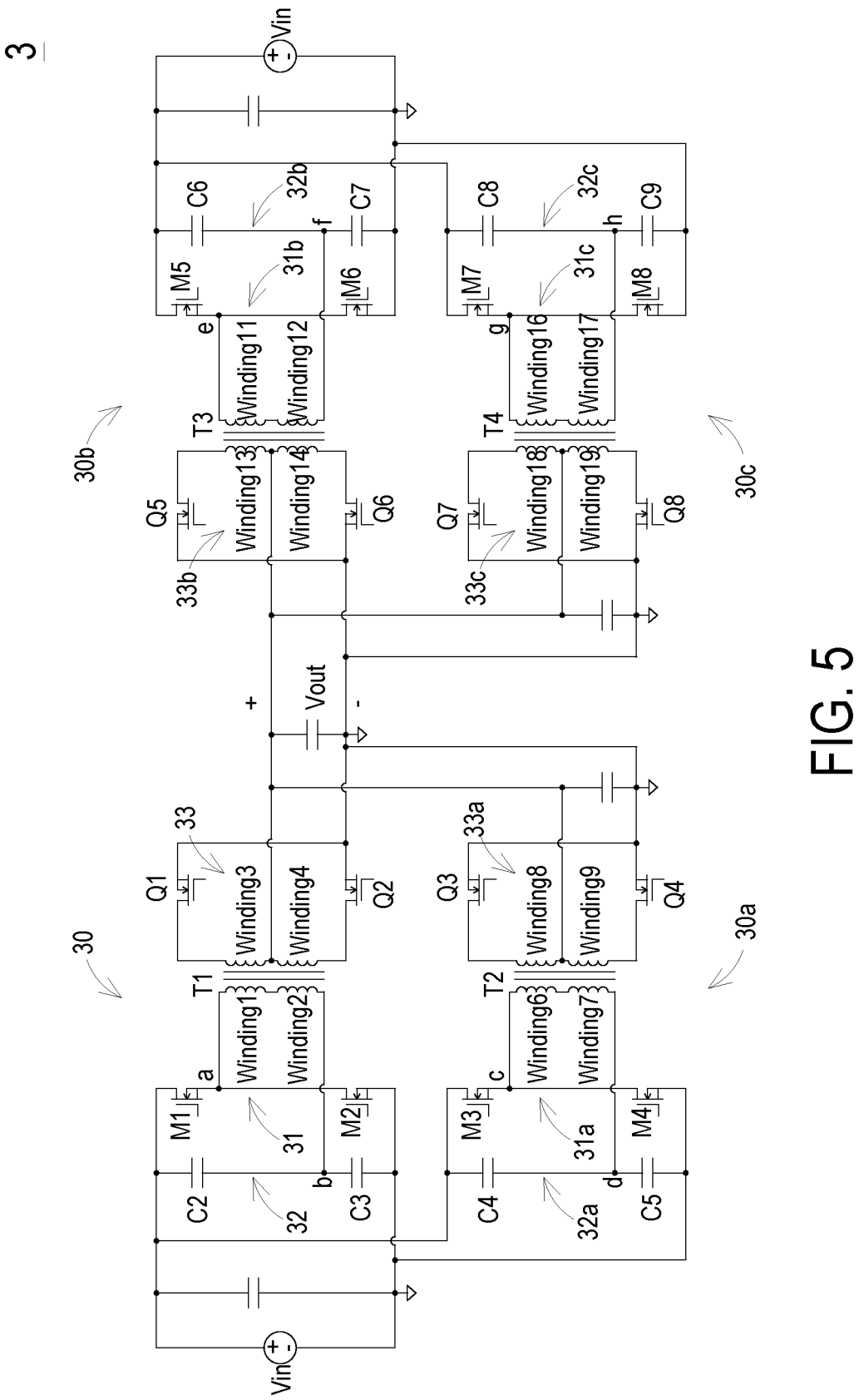
FIG. 5 is a schematic circuit diagram illustrating the circuitry topology of a power converter according to a third embodiment of the present disclosure.
Figure 6:
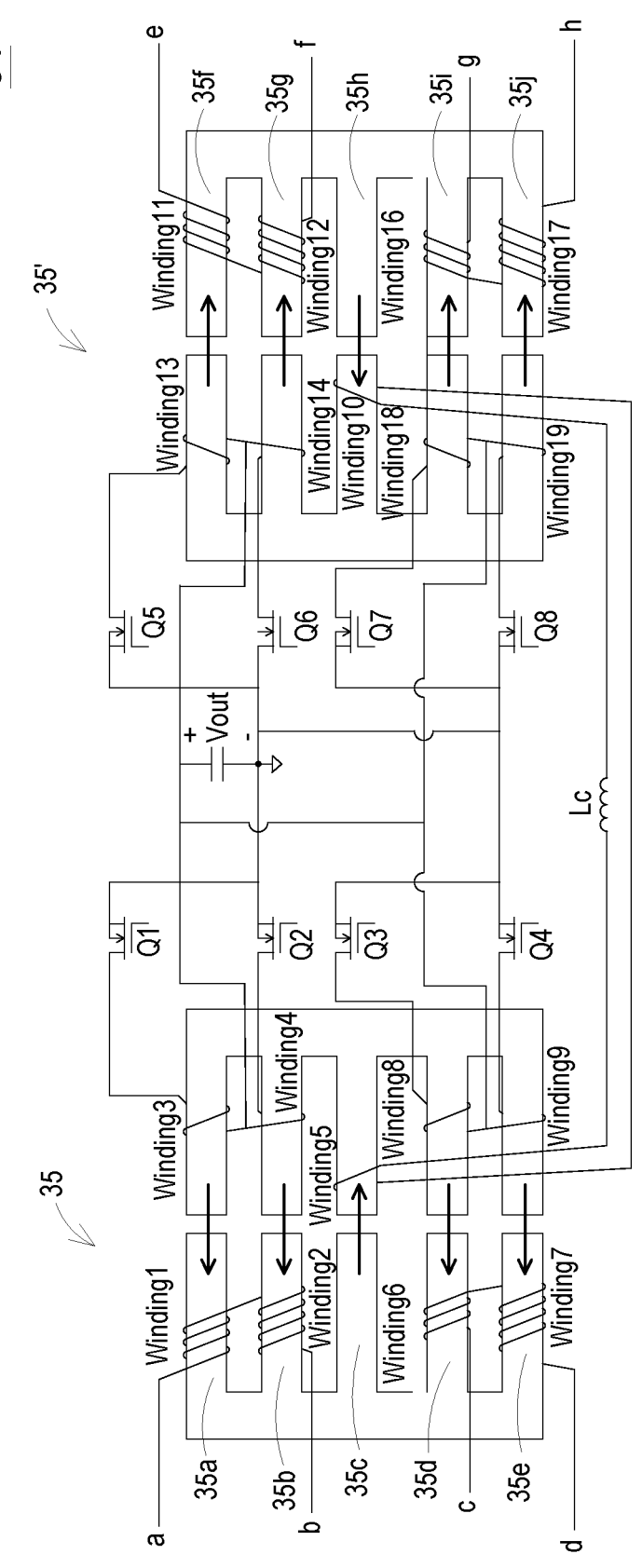
FIG. 6 schematically illustrates a magnetic element and associated windings for the power converter according to the third embodiment of the present disclosure.

FIG. 5 is a schematic circuit diagram illustrating the circuitry topology of a power converter according to a third embodiment of the present disclosure. FIG. 6 schematically illustrates a magnetic element and associated windings for the power converter according to the third embodiment of the present disclosure. It should be noted that the auxiliary windings Winding5 and Winding10 are not shown in FIG. 5.

Please refer to FIGS. 5 and 6. The power converter 3 includes a conversion circuit 30, a conversion circuit 30a, a conversion circuit 30b and a conversion circuit 30c. The input terminal of the conversion circuit 30, the input terminal of the conversion circuit 30a, the input terminal of the conversion circuit 30b and the input terminal of the conversion circuit 30c are connected with the input terminal of the power converter 3 in parallel and electrically connected with an input power source Vin. The output terminal of the conversion circuit 30, the output terminal of the conversion circuit 30a, the output terminal of the conversion circuit 30b and the output terminal of the conversion circuit 30c are connected with the output terminal of the power converter 3 in parallel and electrically connected with a load (not shown). Each of the conversion circuit 30, the conversion circuit 30a, the conversion circuit 30b and the conversion circuit 30c receives an input voltage from the input power source Vin. By each of the conversion circuit 30, the conversion circuit 30a, the conversion circuit 30b and the conversion circuit 30c, the input voltage from the input power source Vin is converted into an output voltage Vout.

The conversion circuit 30 includes a half-bridge switching circuit 31, a capacitor bridge arm 32, a transformer T1 and a rectifier circuit 33. The half-bridge switching circuit 31 and the capacitor bridge arm 32 are collaboratively formed as a half-bridge inverter circuit of the conversion circuit 30. The half-bridge switching circuit 31 includes two switch elements M1 and M2. The two switch elements M1 and M2 are connected with a first node a. The capacitor bridge arm 32 includes two capacitors C2 and C3. The two capacitors C2 and C3 are connected with a second node b.

The transformer T1 includes a first primary winding Winding1, a second primary winding Winding2, a first secondary winding Winding3 and a second secondary winding Winding4. The first primary winding Winding1, the second primary winding Winding2, the first secondary winding Winding3 and the second secondary winding Winding4 are magnetically coupled with each other. The first primary winding Winding1 and the second primary winding Winding2 are serially connected between the first node a and the second node b. The first secondary winding Winding3 and the second secondary winding Winding4 are connected with each other. The node between the first secondary winding Winding3 and the second secondary winding Winding4 is connected with an output positive terminal of the output terminal of the conversion circuit 30.

The input terminal of the rectifier circuit 33 is electrically connected with the first secondary winding Winding3 and the second secondary winding Winding4. The output terminal of rectifier circuit 33 is electrically connected with an output negative terminal of the output terminal of conversion circuit 30. The rectifier circuit 33 includes two rectifier switches Q1 and Q2.

The conversion circuit 30a includes a half-bridge switching circuit 31a, a capacitor bridge arm 32a, a transformer T2 and a rectifier circuit 33a. The half-bridge switching circuit 31a and the capacitor bridge arm 32a are collaboratively formed as a half-bridge inverter circuit of the conversion circuit 30a. The half-bridge switching circuit 31a includes two switch elements M3 and M4. The two switch elements M3 and M4 are connected with a first node c. The capacitor bridge arm 32a includes two capacitors C4 and C5. The two capacitors C4 and C5 are connected with a second node d.

The transformer T2 includes a first primary winding Winding6, a second primary winding Winding7, a first secondary winding Winding8 and a second secondary winding Winding9. The first primary winding Winding6, the second primary winding Winding7, the first secondary winding Winding8 and the second secondary winding Winding9 are magnetically coupled with each other. The first primary winding Winding6 and the second primary winding Winding7 are serially connected between the first node c and the second node d. The first secondary winding Winding8 and the second secondary winding Winding9 are connected with each other. The node between the first secondary winding Winding8 and the second secondary winding Winding9 is connected with an output positive terminal of the output terminal of the conversion circuit 30a.

The input terminal of the rectifier circuit 33a is electrically connected with the first secondary winding Winding8 and the second secondary winding Winding9. The output terminal of rectifier circuit 33a is electrically connected with an output negative terminal of the output terminal of conversion circuit 30a. The rectifier circuit 33a includes two rectifier switches Q3 and Q4.

The conversion circuit 30b includes a half-bridge switching circuit 31b, a capacitor bridge arm 32b, a transformer T3 and a rectifier circuit 33b. The half-bridge switching circuit 31b and the capacitor bridge arm 32b are collaboratively formed as a half-bridge inverter circuit of the conversion circuit 30b. The half-bridge switching circuit 31b includes two switch elements M5 and M6. The two switch elements M5 and M6 are connected with a first node e. The capacitor bridge arm 32b includes two capacitors C6 and C7. The two capacitors C6 and C7 are connected with a second node f.

The transformer T3 includes a first primary winding Winding11, a second primary winding Winding12, a first secondary winding Winding13 and a second secondary winding Winding14. The first primary winding Winding11, the second primary winding Winding12, the first secondary winding Winding13 and the second secondary winding Winding14 are magnetically coupled with each other. The first primary winding Winding11 and the second primary winding Winding12 are serially connected between the first node e and the second node f. The first secondary winding Winding13 and the second secondary winding Winding14 are connected with each other. The node between the first secondary winding Winding13 and the second secondary winding Winding14 is connected with an output positive terminal of the output terminal of the conversion circuit 30b.

The input terminal of the rectifier circuit 33b is electrically connected with the first secondary winding Winding13 and the second secondary winding Winding14. The output terminal of rectifier circuit 33b is electrically connected with an output negative terminal of the output terminal of conversion circuit 30b. The rectifier circuit 33b includes two rectifier switches Q5 and Q6.

The conversion circuit 30c includes a half-bridge switching circuit 31c, a capacitor bridge arm 32c, a transformer T4 and a rectifier circuit 33c. The half-bridge switching circuit 31c and the capacitor bridge arm 32c are collaboratively formed as a half-bridge inverter circuit of the conversion circuit 30c. The half-bridge switching circuit 31c includes two switch elements M7 and M8. The two switch elements M7 and M8 are connected with a first node g. The capacitor bridge arm 32c includes two capacitors C8 and C9. The two capacitors C8 and C9 are connected with a second node h.

The transformer T4 includes a first primary winding Winding16, a second primary winding Winding17, a first secondary winding Winding18 and a second secondary winding Winding19. The first primary winding Winding16, the second primary winding Winding17, the first secondary winding Winding18 and the second secondary winding Winding19 are magnetically coupled with each other. The first primary winding Winding16 and the second primary winding Winding17 are serially connected between the first node g and the second node h. The first secondary winding Winding18 and the second secondary winding Winding19 are connected with each other. The node between the first secondary winding Winding18 and the second secondary winding Winding19 is connected with an output positive terminal of the output terminal of the conversion circuit 30c.

The input terminal of the rectifier circuit 33c is electrically connected with the first secondary winding Winding18 and the second secondary winding Winding19. The output terminal of rectifier circuit 33c is electrically connected with an output negative terminal of the output terminal of conversion circuit 30c. The rectifier circuit 33c includes two rectifier switches Q7 and Q8.

The power converter 3 further includes a magnetic element 34. The magnetic element 34 includes at least two magnetic core assemblies. As shown in FIG. 6, the magnetic element 34 includes two magnetic core assemblies 35 and 35'. The magnetic core assembly 35 and the associated windings are collaboratively formed as the transformers T1 and T2 (i.e., the transformers T1, T2 share the magnetic core assembly 35). The magnetic core assembly 35' and the associated windings are collaboratively formed as the transformers T3 and T4 (i.e., the transformers T3, T4 share the magnetic core assembly 35').

The magnetic core assembly 35 includes five magnetic legs. The transformers T1, T2 include the magnetic core assembly 35, the first primary winding Winding1, the second primary winding Winding2, the first primary winding Winding6, the second primary winding7, the first secondary winding Winding3, the second secondary winding Winding4, the first secondary winding Winding8, the second secondary winding Winding9 and an auxiliary winding Winding5 (i.e., The transformers T1, T2 share the auxiliary winding Winding5). The five magnetic legs include a first lateral leg 35a, a first internal leg 35b, a middle leg 35c, a second internal leg 35d and a second lateral leg 35e.

The first primary winding Winding1 is wound on the first lateral leg 35a. The second primary winding Winding2 is wound on the first internal leg 35b. The first primary winding Winding6 is wound on the second internal leg 35d. The second primary winding Winding7 is wound on the second lateral leg 35e. The first secondary winding Winding3 is wound on the first lateral leg 35a. The second secondary winding Winding4 is wound on the first internal leg 35b. The first secondary winding Winding8 is wound on the second internal leg 35d. The second secondary winding Winding9 is wound on the second lateral leg 35e. The auxiliary winding Winding5 is wound on the middle leg 35c.

The structure of the magnetic core assembly 35' is similar to the structure of the magnetic core assembly 35. That is, the magnetic core assembly 35' includes five magnetic legs. The transformer T3, T4 include the magnetic core assembly 35', the first primary winding Winding11, the second primary winding Winding12, the first primary winding Winding16, the second primary winding Winding17, the first secondary winding Winding13, the second secondary winding Winding14, the first secondary winding Winding18, the second secondary winding Winding19 and an auxiliary winding Winding10 (i.e., The transformers T3, T4 share the auxiliary winding Winding10). The five magnetic legs include a first lateral leg 35f, a first internal leg 35g, a middle leg 35h, a second internal leg 35i and a second lateral leg 35j.

The first primary winding Winding11 is wound on the first lateral leg 35f. The second primary winding Winding12 is wound on the first internal leg 35g. The first primary winding Winding16 is wound on the second internal leg 35i. The second primary winding Winding17 is wound on the second lateral leg 35j. The first secondary winding Winding13 is wound on the first lateral leg 35f. The second secondary winding Winding14 is wound on the first internal leg 35g. The first secondary winding Winding18 is wound on the second internal leg 35i. The second secondary winding Winding19 is wound on the second lateral leg 35j. The auxiliary winding Winding10 is wound on the middle leg 35h.

The auxiliary winding Winding5, the auxiliary winding Winding10 and an inductor Lc are serially connected with each other and formed as a closed loop. For example, the inductor Lc is an individual inductor device. Alternatively, the inductor Lc is a parasitic inductor of at least one auxiliary winding. The closed loop passes through the first magnetic core assembly 35 and the second magnetic core assembly 35'. Since the auxiliary winding Winding5 and the auxiliary winding Winding10 are connected with each other, the four transformers T1, T2, T3 and T4 are magnetically coupled with each other.

In this embodiment, the first primary winding Winding1, the second primary winding Winding2, the first primary winding Winding6, the second primary winding Winding7, the first secondary winding Winding3, the second secondary winding Winding4, the first secondary winding Winding8, the second secondary winding Winding9 are collaboratively formed as an anti-coupling current doubler circuit. Similarly, the first primary winding Winding11, the second primary winding Winding12, the first primary winding Winding16, the second primary winding Winding17, the first secondary winding Winding13, the second secondary winding Winding14, the first secondary winding Winding18 and the second secondary winding Winding19 are collaboratively formed as another anti-coupling current doubler circuit.

The operations of the magnetic element 34 are similar to the operations of the magnetic elements in the above embodiments, and not redundantly described herein.

In the above embodiments, each of the inductors Lc, Lc1 and Lc2 is a parasitic inductor of at least one auxiliary winding of the corresponding transformer in the magnetic element.

As mentioned above, the number of the at least two auxiliary windings is M times the number of the at least two magnetic core assemblies, wherein M is a positive integer.

In an embodiment, the magnetic core assembly is an integral magnetic core. In another embodiment, the magnetic core assembly is a combination of a first magnetic core and a second magnetic core, e.g., EE cores or IE cores. Optionally, there is an air gap between the first magnetic core and the second magnetic core.

From the above descriptions, the present disclosure provides a power converter and a magnetic element of the power converter. The magnetic element includes a plurality of auxiliary windings. Due to the auxiliary windings, a coupling relationship between the transformers of the plurality of parallel-connected conversion circuits is established. Consequently, the load current dynamic effect and the operating efficiency are enhanced.

It is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:
a plurality of conversion circuits connected with each other in parallel, wherein each of the plurality of conversion circuits comprises a transformer;
wherein the transformer of each of the plurality of conversion circuits comprises a magnetic core assembly, at least one primary winding, at least one secondary winding and at least one auxiliary winding,
wherein the magnetic core assembly comprises a plurality of magnetic legs, wherein the at least one primary winding, the at least one secondary winding and the at least one auxiliary winding are wound on the plurality of magnetic legs, and wherein the at least one auxiliary winding of one conversion circuit is serially connected with the at least one auxiliary winding of other conversion circuit to form at least one loop.

2. The power converter according to claim 1, wherein each of the at least one loop passes through the magnetic core assembly.

3. The power converter according to claim 1, wherein the magnetic core assembly comprises a first magnetic core and a second magnetic core, wherein the at least one primary winding is wound on the first magnetic core, and the at least one secondary winding and the auxiliary winding are wound on the second magnetic core.

4. The power converter according to claim 1, wherein each of the plurality of conversion circuits further comprises an inverter circuit, and the inverter circuit is electrically connected with the at least one primary winding of the corresponding transformer, wherein the inverter circuit is a half-bridge inverter circuit or a full-bridge inverter circuit.

5. The power converter according to claim 1, wherein a number of the auxiliary winding is M times a number of the magnetic core assembly, wherein M is a positive integer.

6. The power converter according to claim 1, wherein the auxiliary windings in each of the at least one loop is further connected with an inductor in series.

7. The power converter according to claim 6, wherein the inductor is a parasitic inductor of at least one of the auxiliary windings in the loop.

8. The power converter according to claim 1, wherein the power converter comprises two conversion circuits, the transformer of each of the two conversion circuits comprises the two primary windings, the two secondary windings and the one auxiliary winding, wherein each magnetic core assembly comprises a first lateral leg, a middle leg and a second lateral leg, wherein the two primary windings are connected with each other in series, and wound on the first lateral leg and the second lateral leg, respectively, wherein the two secondary windings are connected with each other in series, and wound on the first lateral leg and the second lateral leg, respectively, wherein the one auxiliary winding is would on the middle leg.

9. The power converter according to claim 1, wherein the power converter comprises a first conversion circuit and a second conversion circuit, and the transformer of each of the two conversion circuits comprises the one primary winding, the two secondary windings, a first auxiliary winding and a second auxiliary winding, wherein each magnetic core assembly comprises a first lateral leg, a middle leg and a second lateral leg, wherein the one primary winding is wound on the middle leg, wherein the two secondary windings are connected with each other in series, and wound on the first lateral leg and the second lateral leg, respectively, wherein the first auxiliary winding is would on the first lateral leg, and the second auxiliary winding is would on the second lateral leg.

10. The power converter according to claim 9, wherein the first auxiliary winding and the second auxiliary winding of the transformer of the first conversion circuit and the first auxiliary winding and the second auxiliary winding of the transformer of the second conversion circuit are connected with each other and formed as the loop, or, wherein the first auxiliary winding of the transformer of the first conversion circuit and the first auxiliary winding of the transformer of the second conversion circuit are connected with each other and formed as a first loop, and wherein the second auxiliary winding of the transformer of the first conversion circuit and the second auxiliary winding of the transformer of the second conversion circuit are connected with each other and formed as a second loop.

11. The power converter according to claim 1, wherein the power converter comprises four conversion circuits, the four conversion circuits comprises four transformers, wherein the four transformers shares two magnetic core assemblies, wherein the four primary windings, the four secondary windings and the one auxiliary winding are would on the corresponding one of the two magnetic core assemblies, wherein each of the two magnetic core assemblies comprises a first lateral leg, a first internal leg, a middle leg, a second internal leg and a second lateral leg, wherein the fourth primary windings are wound on the first lateral leg, the first internal leg, the second internal leg and the second lateral leg, wherein the four secondary windings are wound on the first lateral leg, the first internal leg, the second internal leg and the second lateral leg, wherein the one auxiliary winding is would on the middle leg, and two of the auxiliary windings of the fourth transformers are connected with each other and formed as the loop.

12. A magnetic element, comprising:
a plurality of transformers connected with each other in parallel,
wherein at least one of the plurality of transformers comprises a magnetic core assembly, at least one primary winding, at least one secondary winding and at least one auxiliary winding, wherein the magnetic core assembly comprises a plurality of magnetic legs, wherein the at least one primary winding, the at least one secondary winding and the at least one auxiliary winding are wound on the plurality of magnetic legs, and wherein the at least one auxiliary winding of one transformer is serially connected with the at least one auxiliary winding of other transformer to form at least one loop.

13. The magnetic element according to claim 12, wherein each of the at least one loop passes through the magnetic core assembly.

14. The magnetic element according to claim 12, wherein the magnetic core assembly comprises a first magnetic core and a second magnetic core, wherein the at least one primary winding is wound on the first magnetic core, and the at least one secondary winding and the auxiliary winding are wound on the second magnetic core.

15. The magnetic element according to claim 12, wherein a number of the auxiliary winding is M times a number of the magnetic core assembly, wherein M is a positive integer.

16. The magnetic element according to claim 12, wherein the auxiliary windings in each of the at least one loop is further connected with an inductor in series.

17. The magnetic element according to claim 16, wherein the inductor is a parasitic inductor of at least one of the auxiliary windings in the loop.

18. The magnetic element according to claim 12, wherein the plurality of transformers comprise two transformers, and each of the two transformers comprises the two primary windings, the two secondary windings and the one auxiliary winding, wherein each magnetic core assembly comprises a first lateral leg, a middle leg and a second lateral leg, wherein the two primary windings are connected with each other in series, and wound on the first lateral leg and the second lateral leg, respectively, wherein the two secondary windings are connected with each other in series, and wound on the first lateral leg and the second lateral leg, respectively, wherein the one auxiliary winding is would on the middle leg.

19. The magnetic element according to claim 13, wherein the magnetic element comprises a first transformer and a second transformer, and each of the plurality of transformers comprises the one primary winding, the two secondary windings, a first auxiliary winding and a second auxiliary winding, wherein each magnetic core assembly comprises a first lateral leg, a middle leg and a second lateral leg, wherein the one primary winding is wound on the middle leg, wherein the two secondary windings are connected with each other in series, and wound on the first lateral leg and the second lateral leg, respectively, wherein the first auxiliary winding is would on the first lateral leg, and the second auxiliary winding is would on the second lateral leg.

20. The magnetic element according to claim 19, wherein the first auxiliary winding and the second auxiliary winding of the first transformer and the first auxiliary winding and the second auxiliary winding of the second transformer are connected with each other and formed as the loop, or, wherein the first auxiliary winding of the first transformer and the first auxiliary winding of the second transformer are connected with each other and formed as a first loop, and wherein the second auxiliary winding of the first transformer and the second auxiliary winding of the second transformer are connected with each other and formed as a second loop.

21. The magnetic element according to claim 12, wherein the magnetic element comprises four transformers, and the four transformers shares two magnetic core assemblies, wherein the four primary windings, the four secondary windings and the one auxiliary winding are would on the corresponding one of the two magnetic core assemblies, wherein each of the two magnetic core assemblies comprises a first lateral leg, a first internal leg, a middle leg, a second internal leg and a second lateral leg, wherein the fourth primary windings are wound on the first lateral leg, the first internal leg, the second internal leg and the second lateral leg, wherein the four secondary windings are wound on the first lateral leg, the first internal leg, the second internal leg and the second lateral leg, wherein the one auxiliary winding is would on the middle leg, and two of the auxiliary windings of the fourth transformers are connected with each other and formed as the loop.

* * * * *